Feb. 21, 1956 R. W. KENNEY 2,735,442
AUTOMATIC CONTROL FOR LIQUID SUPPLYING CONDUIT
Filed Feb. 6, 1953 3 Sheets-Sheet 1

INVENTOR.
ROBERT W. KENNEY
BY Chas. E. Reif
ATTORNEY.

Feb. 21, 1956  R. W. KENNEY  2,735,442
AUTOMATIC CONTROL FOR LIQUID SUPPLYING CONDUIT
Filed Feb. 6, 1953  3 Sheets-Sheet 3

INVENTOR.
ROBERT W. KENNEY
BY Chas. C. Reif
ATTORNEY.

United States Patent Office 2,735,442
Patented Feb. 21, 1956

2,735,442

AUTOMATIC CONTROL FOR LIQUID SUPPLYING CONDUIT

Robert W. Kenney, South Pasadena, Calif., assignor to Stanley G. Harwood, South Pasadena, Calif.

Application February 6, 1953, Serial No. 335,489

3 Claims. (Cl. 137—413)

This invention relates to a control device for supplying fluid or liquid to a container or other means and particularly to such a control device which is actuated by the said fluid or liquid.

It is an object of this invention to provide a control device for a conduit which supplies liquid comprising a valve for permitting or preventing flow of liquid through said conduit, together with a second valve or control member having two members with passages therethrough each having a portion formed as a valve seat, one of said members being movable by fluid or liquid actuated means, together with a valve member with which said first mentioned members are respectively engageable so that fluid is directed through one or the other of said first mentioned members for opening or closing said first mentioned valve.

It is a further object of this invention to provide a control device for a liquid supplying conduit comprising a valve for permitting or preventing flow of liquid through said conduit, said valve including a member movable by pressure of said liquid, together with a second valve or control device having a stationary member having a passage therethrough and comprising a valve seat, a second member having a passage therethrough and comprising a valve seat, said last mentioned passage communicating with the atmosphere, a valve member adapted to respectively engage said valve seats to close said passages, means normally urging said valve member into engagement with the valve seat of said stationary member, and liquid actuated means for moving said second member to cause its valve seat to engage said valve member and move said valve member away from said valve seat of said stationary member, a second conduit extending from said first mentioned conduit and adapted to be connected with said passage through said stationary member, a third conduit connected to one side of said movable member in said first mentioned valve and adapted to be connected to said passage in said second member whereby when said third conduit is connected to said second member the pressure at one side of said member in said first mentioned valve is reduced and the pressure of liquid in said first mentioned conduit opens said valve and when said movable member in said second valve or control device engages said valve member, said second conduit will be connected to the passage through said stationary member and to said third conduit whereby pressure will be placed on said movable member in said first mentioned valve and act to close said first mentioned valve.

It is more specifically an object of this invention to provide a control device for a conduit supplying liquid to a container, said conduit having a valve therein for permitting or preventing flow of liquid therethrough, said first mentioned valve having a diaphragm forming a chamber at one side thereof, said diaphragm being moved by pressure at either side thereof to open or close said valve, together with a second valve or control device comprising a movable member having a passage therethrough and formed at one end as a valve seat, a stationary member having a passage therethrough and formed at one end as a valve seat, a valve disk arranged to respectively engage said valve seats, means urging said valve member into engagement with the valve seat of said stationary member, a second conduit extending from said first mentioned conduit and adapted to be connected to the passage through said stationary member, a third conduit connected to said chamber and said first mentioned valve and adapted to be connected with the passage through said movable member in said second valve, which passage communicates with the atmosphere, means in said first mentioned valve normally acting to move said diaphragm to close said first mentioned valve, and a float moved by the liquid in said container for moving said movable member whereby when said float is in its lower position, said valve disk engages the valve seat of said stationary member and said movable member is moved away from said valve disk so that said chamber is connected through said third conduit to the passage in said movable member and to the atmosphere whereby pressure is lowered in said chamber and the pressure of liquid at the other side of said diaphragm moves said diaphragm to open said first mentioned valve and when said float is in its upper position said movable member is moved to have its valve seat engage said valve disk and move the same away from said valve seat of said stationary member and said second conduit is connected through the passage in said stationary member to said third conduit and chamber and pressure is supplied to said chamber and diaphragm, which with said second mentioned means acts to close said first mentioned valve.

These and other objects and advantages of the invention will be fully set forth in the following description made in connection with the accompanying drawings in which like reference characters refer to similar parts throughout the several views and in which.

Figure 1:
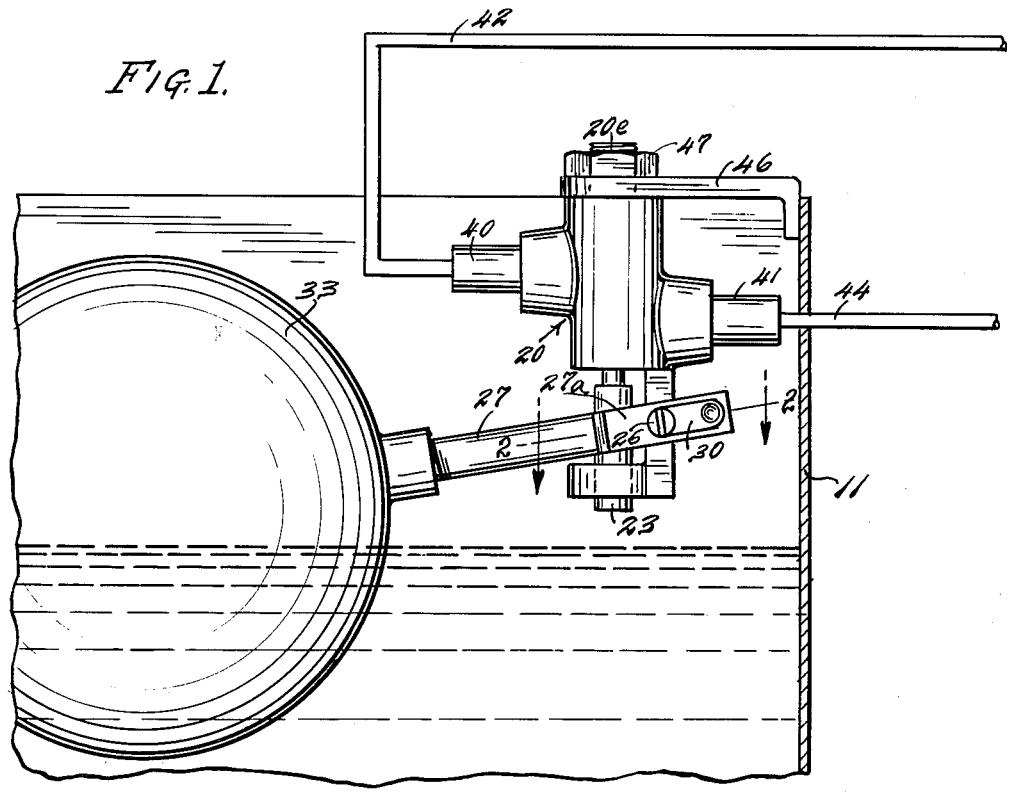
Fig. 1 is a view showing a container in vertical section and showing a portion of the device in side elevation.
Figure 2:
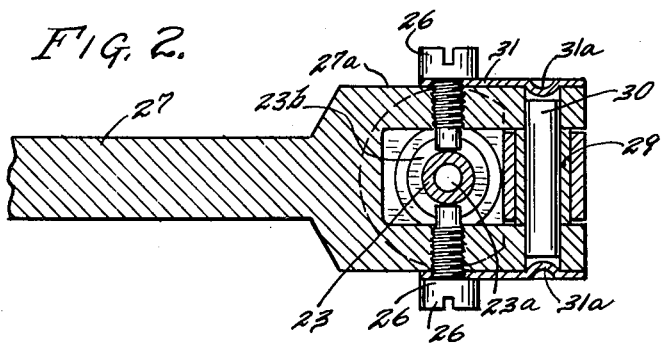
Fig. 2 is a horizontal section taken substantially on line 2—2 of Fig. 1, as indicated by the arrows.

Referring to the drawings, a conduit 10 is shown adapted to supply fluid or liquid, and in the embodiment of the invention illustrated, said conduit communicates with and is adapted to supply fluid or liquid to a container 11. Conduit 10 has therein a valve 12 and while different valves may be used, in the embodiment of the invention illustrated, valve 12 has a casing 12a across which extends a flexible diaphragm 12b. Diaphragm 12b is held at its edge portions between separate parts of casing 12a which will be connected in any suitable manner. Diaphragm 12b is clamped between plates 12c and 12d at the sides thereof respectively, and said diaphragm is guided in its movement by a rod 12e extending from plate 12d and guided in a passage in the upper part of casing 12a. Plate 12c is formed as a valve member and the same engages a valve seat 12i formed on casing 12a. A rod 12f extends downwardly from plate 12c and is guided in a passage in the lower portion of casing 12a. Valve 12 has flanges at each end which are connected to mating flanges on conduit 10 by circumferential spaced bolts 14. Conduit 10 also has a flange at one end connected to container 11 by circumferentially spaced bolts 16. A compression coiled spring 17 is disposed in chamber 12g, the same having its lower end engaging plate 12d and its upper end engaging the top of casing 12a. Said spring normally urges diaphragm 12b downward thus acting to close valve 12. Casing 12a thus has a chamber 12g above diaphragm 12b and has a chamber 12h below said diaphragm, which latter chamber communicates with conduit 10 so that the pressure of liquid in conduit 10 will be present in chamber 12h.

A second valve or control device is provided comprising a casing 20. Said casing has a passage therein containing spaced bushings 21 between which is disposed an O-ring 22. A movable member 23 is slidable in bushings 21 and O-ring 22. Said bushings and O-ring prevent the passage of liquid along member 23. Member 23 also slides in a bushing 24 in the lower part of casing 20. Member 23 has a passage 23a extending longitudinally therethrough and said member is formed at its upper end as a valve seat. Member 23 has an annular groove 23b therein into which extend the ends of a pair of screws 26 which are threaded into the sides of a fork or bifurcated end 27a of a lever 27. Casing 20 has a portion provided with a transverse bore in which is disposed a bushing 29. A pivot pin 30 extends through bushing 29 and its ends extend into the sides of portion 27a. Plates 31 extend respectively over the end portions and the same have indentations 31a pressed therein toward the ends of pin 30. Plates 31 are held in place by screws 26. Lever 27 is connected to a float member 33 which will be raised and lowered with the liquid in container 11. Casing 20 has a stationary portion or member 20a which has a passage 20b therethrough and is formed at its upper end as a valve seat. A valve member or disk 34 is provided, the same being fitted in and carried in a recess in a member 36 having a stem 36a slidable in a bushing 37 disposed in a bore in casing 20. A compression coiled spring 38 surrounds said stem 36a, the same bearing against member 36 at one end and bearing at its other end against casing 20. A member 40, shown as of cylindrical form with a chamber therein, has an open end and the open end portion thereof is threaded into casing 20. A similar member 41 has its open end portion threaded into the opposite side of casing 20. Member 36 moves in a chamber in casing 20 which extends to the chamber in member 40. The passage 20b communicates with the chamber in member 41 through a passage 20c. A conduit 42 is connected to member 40 and communicates with the chamber therein, said conduit extending to conduit 10 and communicating therewith. Another conduit 44 is connected to the end of member 41 and communicates with the chamber therein, said conduit extending to and communicating with the chamber 12g. Casing 20 has a portion 20d threaded into the top portion thereof, which portion 20d has an upper threaded portion 20e. Portion 20e is threaded into a supporting bracket 46 and a nut 47 is threaded on portion 20e which engages bracket 46. Bracket 46 will be supported in any suitable manner, as by being welded to the side of container 11, as shown.

When the pressure is reduced in chamber 12g of valve 12 the pressure of the liquid in conduit 10 will move plate 12c and diaphragm 12b upwardly against the pressure of spring 17 and thus open valve 12. When the pressure of the liquid is supplied to chamber 12g, this pressure, together with the pressure of spring 17, will move member 12c downwardly against seat 12i and close valve 12.

Figure 3:
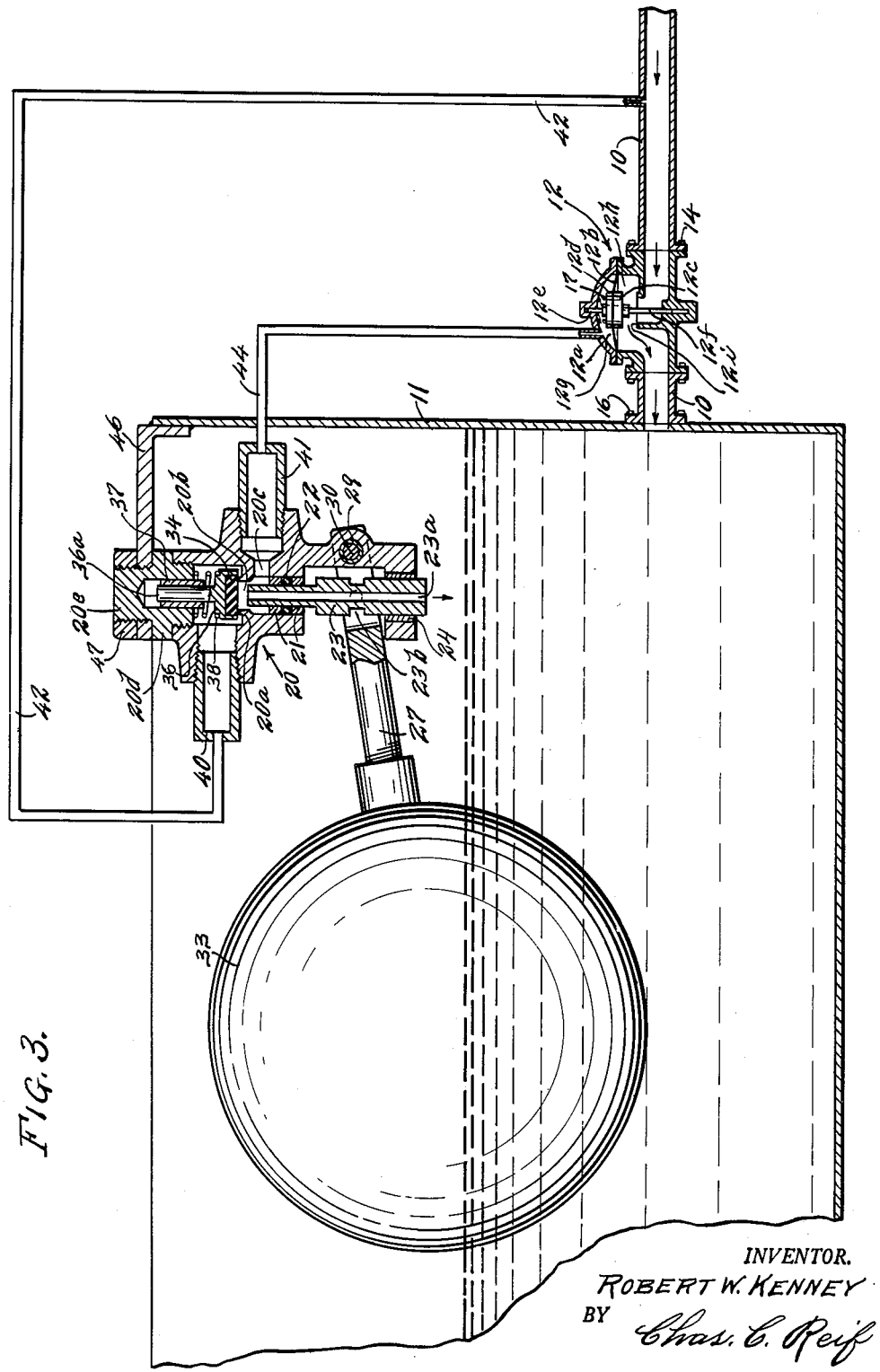
Fig. 3 is a view in vertical section of the device.
Figure 4:
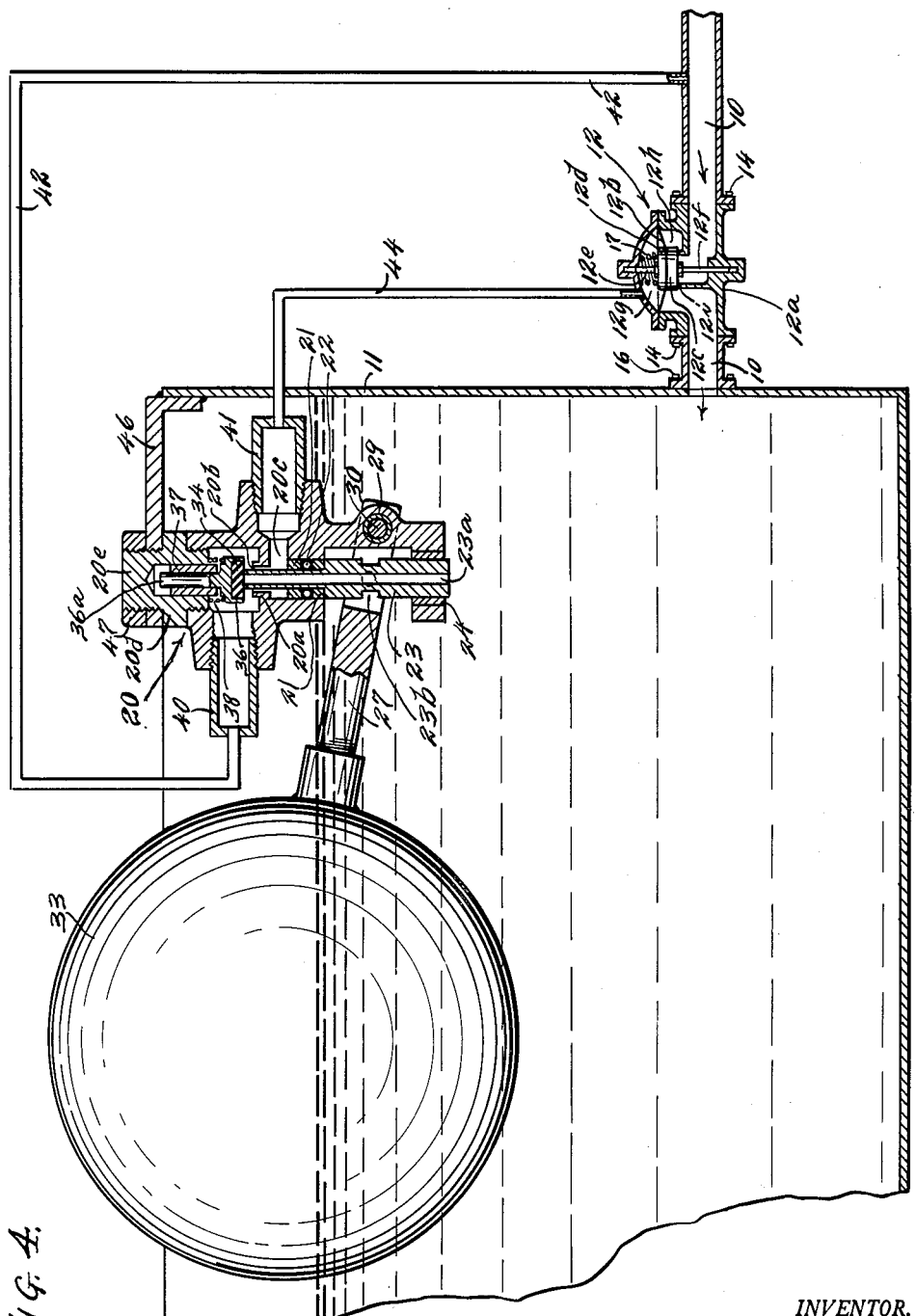
Fig. 4 is a view in vertical section showing the device with certain parts in different positions.

When the float 33 is in a lower position, as shown in Figs. 1 and 3, lever 27 moves member 23 downwardly. The upper or valve seat end of member 23 is then moved away from the valve member 34. Spring 38 then moves member 36 and valve member 34 against the valve seat on portion or member 20a. With the parts in this position any pressure in chamber 12g is relieved and any liquid therein can pass through conduit 44, through member 41 and passage 20c, then through passage 23a to the atmosphere. The pressure is thus reduced in chamber 12g and the pressure of liquid in conduit 10 will act on member 12c and diaphragm 12b and move the valve 12 to open position. Liquid will now pass through conduit 10 to container 11. When the liquid rises in container 11, float 33 will be moved upwardly, as shown in Fig. 4, and member 23 will be moved upwardly by lever 27. The upper and valve seat end of member 23 will engage the valve disk 34 so that the upper end of member 23 is closed. The upward movement of member 23 will move valve member 34 and member 36 upwardly against the pressure of spring 38 so that valve member 34 is now moved away from the valve seat on member or portion 20a. Liquid can now pass from conduit 10 through conduit 42, into the chamber in member 40, and then downwardly through the passage 20b and through passage 20c to the chamber in member 41, and then through conduit 44 to chamber 12g. The pressure of the liquid in conduit 10 is now applied to the diaphragm 12b and this together with the pressure of spring 17 will move said diaphragm and member 12c downwardly so that the latter will engage the valve seat 12i and close valve 12. The flow of liquid into container 11 is thus stopped and will remain stopped until float 33 moves downwardly sufficiently to move member 23 below the valve seat of portion or member 20a. The flow of liquid through conduit 10 is thus controlled as desired.

From the above description it will be seen that I have provided quite a simple and yet very efficient liquid actuated control for controlling the flow of liquid into container 11. No manual operation is necessary and the device responds altogether to liquid actuated means. The device is easily constructed and its installation is quite simple and easy. The same has been amply demonstrated in actual practice and found to be very successful and efficient.

It will of course be understood that various changes may be made in the form, details, arrangement and proportions of the parts, without departing from the scope of applicant's invention, which generally stated consists in a device capable of carrying out the objects above set forth, in the parts and combinations of parts disclosed and defined in the appended claims.

What is claimed is:

1. A device for controlling the level of fluid in a container to be used in connection with an inlet conduit having a pressure responsive valve therein comprising a casing positioned within and integral with said container having in combination, a valve normally in closed position, a movable valve seat having a passage therethrough to the atmosphere adapted to be moved to open said valve, means responsive to the water level in said container for operating said movable valve seat, a conduit connecting one side of said valve with one side of said pressure responsive valve, a second conduit connecting said passage and said movable valve seat and the other side of said valve with the other side of said pressure responsive valve whereby when said valve is seated, said second conduit drains through said passage in said movable valve seat reducing the pressure at one side of said pressure responsive valve whereby the pressure of the normal flow of fluid through said inlet conduit opens and passes through said pressure responsive valve into said container and as the level of fluid rises in said container said movable valve seat is moved against said valve to open the same and simultaneously close said passage in said movable valve seat whereby said first conduit drains into said second conduit increasing the pressure at said last mentioned side of said pressure responsive valve to place and hold the same in closed position.

2. A device for controlling the level of fluid in a container in connection with an inlet conduit having a pressure responsive valve therein comprising a casing positioned within and integral with said container having in combination, a passage, a stationary valve seat having a passage therethrough communicating with said first mentioned passage, a valve normally seated on said valve seat, a movable valve seat having a passage therethrough to the atmosphere and communicating with said first mentioned passage, means in said container for moving said movable valve seat to move said valve to open position, a conduit connecting said first mentioned passage through one side of said stationary valve seat with said inlet conduit at one side of said pressure responsive valve, a conduit connecting the other side of said pressure responsive valve with said passage in said movable valve seat and with said first mentioned passage at the other side of said stationary valve seat whereby said movable valve seat controls said pressure responsive valve and the flow of fluid through said inlet conduit into said container.

3. A device for controlling the level of fluid in a container in connection with an inlet conduit having a pressure responsive valve therein comprising a casing positioned within and integral with said container having in combination, a stationary valve seat having a passage therethrough, a valve normally in closed position on said valve seat, a movable valve seat having a passage therethrough to the atmosphere and adapted to be moved against said valve to move the same to open position, a chamber for communication between said passage in said stationary seat and said passage in said movable seat, a float pivoted in said container adapted to move said movable valve seat upwardly and downwardly responsive to change of level of fluid in said container, a conduit providing communication between said chamber at one side of said valve and said inlet conduit at one side of said pressure responsive valve, a conduit providing communication between said chamber at the other side of said valve and with said passage in said movable valve seat with the other side of said pressure responsive valve whereby in one position said passage through said movable valve seat provides communication between one side of said pressure responsive valve and the atmosphere and in its other position in moving said valve to open position communication is provided between said last two mentioned conduits to increase the pressure at said last mentioned side of said pressure responsive valve to close said valve.

References Cited in the file of this patent

UNITED STATES PATENTS

| | | |
|---|---|---|
| 1,000,024 | Lees et al. | Aug. 8, 1911 |
| 1,100,601 | Miller | June 16, 1914 |
| 1,642,926 | Imschweiler | Sept. 20, 1927 |
| 2,178,866 | Thomas | Nov. 7, 1939 |